United States Patent [19]
Valentine

[11] 3,991,489
[45] Nov. 16, 1976

[54] EDUCATIONAL DEVICE FOR LEARNING THE FUNDAMENTALS OF AN AUTOMOTIVE CARBURETOR SYSTEM

[75] Inventor: Charles Glenn Valentine, Stamford, Conn.

[73] Assignee: Xerox Corporation, Stamford, Conn.

[22] Filed: Apr. 12, 1974

[21] Appl. No.: 460,418

Related U.S. Application Data

[63] Continuation-in-part of Ser. No. 345,920, March 29, 1973, abandoned.

[52] U.S. Cl. .................................... 35/13; 35/7 A
[51] Int. Cl.² ........................................ G09B 25/02
[58] Field of Search .............. 35/7 A, 8 R, 8 A, 9 R, 35/9 A, 9 B, 9 C, 10, 13, 19 R, 19 A, 48 R; 40/142 A; 123/119

[56] References Cited
UNITED STATES PATENTS

| | | | |
|---|---|---|---|
| 3,077,696 | 2/1963 | Barnett et al. | 35/19 A |
| 3,245,156 | 4/1966 | De Bloois et al. | 35/8 A |
| 3,423,846 | 1/1969 | Arend | 35/19 A |
| 3,514,873 | 6/1970 | Stobbe | 40/142 A X |
| 3,520,074 | 7/1970 | Severin et al. | 35/48 R |
| 3,651,592 | 3/1972 | McCormick et al. | 40/142 A |

OTHER PUBLICATIONS

The Way Things Work, An Illustrated Encyclopedia of Technology; Simon & Schuster, New York, 1967, pp. 478–479.

*Primary Examiner*—Richard C. Pinkham
*Assistant Examiner*—Vance Y. Hum

[57] ABSTRACT

An educational kit for teaching the parts and operation of a typical automotive carburetion system is disclosed. The kit comprises audiovisual instructional equipment, a simulator board upon which is graphically depicted indicia representing a schematic diagram of a basic automotive carburetion system, and a plurality of manipulative pieces upon which are graphically depicted schematic diagrams of various parts and circuits of an automotive carburetor assembly, or word indicia naming various parts of said system. The pieces are adapted to be positioned on the simulator board such that the user of the kit may graphically depict the assembly, relationship of parts, and operation of an automotive carburetor system.

8 Claims, 8 Drawing Figures

AUDIO VISUAL MEANS

FIG. 5

WORK SHEETS

EDUCATIONAL DEVICE FOR LEARNING THE FUNDAMENTALS OF AN AUTOMOTIVE CARBURETOR SYSTEM

This application is a continuation-in-part of applicant's copending application, Ser. No. 345,920, filed Mar. 29, 1973, now abandoned.

BACKGROUND OF THE INVENTION

The present invention relates to a portable, compact and easily assembled educational kit. More specifically, the present invention is directed towards an educational kit for teaching the assembly, relationship of parts and operation of an automotive carburetor system comprising as the essential components thereof an audiovisual instructional means, a simulator board bearing graphic indicia thereon, and a plurality of manipulative pieces bearing graphic indicia thereon, which indicia is relatable to the indicia present on the simulator board such that the student can demonstrate his understanding of the fundamentals of an automotive carburetor assembly by arranging certain of the manipulative pieces on the board in a logical sequence.

A problem of increasing difficulty in the education field is that of providing a relatively simple means for instructing students, whether in the classical elementary or high school subjects, or in the various occupational technologies. The effectiveness of the traditional method of teaching involving the teacher/textbook/student relationship is measured not so much by the qualitative aspects of the information conveyed, but rather by how much of the information conveyed is absorbed, understood and learned by the particular student. In recent years, the trend in education has witnessed the introduction of a number of educational teaching devices generally aimed at the pre-college or pre-high school age group. The most common of these devices are the mechanical or computer devices designed to be used by individual students. The theory behind the increasing use of such devices is that account is made of the individual differences in ability, speed and grasp of subject matter, thereby permitting the student to learn at his own pace and with minimum supervision by the teacher. Some of these devices, such as the video computer type devices, are designed to take over a substantial part of the responsibility for providing and transmitting basic information. Others are designed simply to supplement the teacher's own instructional materials by introducing new dimensions into the learning process whereby, for example, spelling may be associated with pictures of objects, mathematical concepts associated with relative sizes and shapes of objects, or correct responses to questions posed by a computer type device rewarded by permission to proceed.

The advantages of a teaching method using a device geared for the individual whereby both the teacher and the individual may be appraised of the individual's progress are not restricted to the traditional elementary or high school subjects; occupational learning materials that take into account individual differences in ability, speed and grasp of subject matter also have a better chance of being effective. However, at the present time, there are very few educational devices available in the community colleges, the junior colleges, the vocational high schools, the trade schools and other special schools where various types of occupational technologies are sought to be taught on a simplified and individualized basis.

Accordingly, it is an object of this invention to provide programmed educational kits which present information using a multimedia approach.

Another object is to provide an educational kit comprising instructional means and simulator means for teaching the assembly, relationship of parts and operation of several fundamental automotive carburetor assemblies.

Another object is to provide an educational kit which is simple, relatively inexpensive, rugged, easily assembled, relatively portable and easily understood.

Another object is to provide an educational kit designed for use by individual students comprising audio, visual or audiovisual instructional means, a simulator board bearing graphic indicia, and a plurality of manipulative pieces bearing graphic indicia depicting schematic diagrams of fundamental automotive carburetor assemblies including carburetor circuits appropriate to various engine operating conditions, or word indicia naming various parts of said system, whereby the student may position the pieces at the appropriate indicia present on the simulator board in response to the instructional means to graphically depict construction of an automotive carburetor system and physically simulate the operation thereof.

SUMMARY OF THE INVENTION

In accordance with the objects and teachings of the present invention, a simple and effective educational kit or unit for the teaching of an automotive carburetor assembly is provided. The unit comprises an instruction means, a simulator board upon which is graphically depicted indicia representing a schematic view of various parts of an automotive carburetor assembly including a float bowl, a carburetor body, an air horn, a throttle linkage, an accelerator pedal, a fuel line, and a fuel pump, and a plurality of various carburetor circuits appropriate to various engine operating conditions or certain descriptive word indicia relating thereto. The kit may also comprise a display board which provides for storage and easy access to the various pieces when the kit is in use.

The kit is designed to present the fundamentals of an automotive carburetor system whereby the student learns the assembly, relationship of parts and operation of said system. This information is conveyed to the student using a programmed multimedia approach whereby the student hears and sees information, performs by answering questions, solving problems and manipulating objects. The kit is designed for individual use or for use by small groups without the need for extensive supervision or participation by an instructor. It permits the student to learn at his own pace and also affords him the chance to capitalize on the way he learns best because he participates in different kinds of learning experiences. He listens to information while viewing a series of related visuals and participates in a manipulative activity which gives him the chance to try doing himself what he has been shown or told how to do. Each time a student learns something new, he responds to this knowledge or skill to make sure he has learned it correctly. First, he performs an activity such as answering a question, solving a problem or manipulating a device. Then he finds out immediately if the action is correct by comparing the result of this action with the one provided by the program. If the student finds that his answer is correct, this instant feedback and learning reinforcement motivates him to continue learning. If he discovers that his answer is wrong or inadequate, he can stop at that point and find out where his error is.

DETAILED DESCRIPTION OF THE INVENTION

Various kinds of instructional means can be employed with the educational kit of this invention. For example, one of the preferred instruction means is an audiovisual presentation using slides or filmstrips in conjunction with a descriptive audio account of the visuals, presented by means of tapes or audio cassettes. A recorded narrator provides background information relating to an automotive carburetor system, including the parts thereof, how the system operates, advantages and disadvantages, and the like. During this audio presentation, a series of synchronized related visuals are shown to the students. These visuals comprise photographs or diagrams of the various parts of an automotive carburetor system during various phases of operation. From this illustration of an automotive carburetor assembly, the principles and function of this system can be understood.

The audiovisual equipment needed will vary depending on the type of instruction to be given. A rear screen projector for small groups, or a projector and screen for a classroom presentation may be used. For the audio presentation, either visual projection equipment with built-in audio capability or a separate recorder may be used. The instructional means provided with the educational kit includes a visual segment available, for example on 35mm slides or filmstrips, and an audio segment available on cassettes. The supporting equipment is normally not included with the kit.

At various points during the presentation, the student is requested to stop the audiovisual presentation and perform certain activities using the simulator board and pieces associated therewith. For example, he may be requested to position one of the carburetor circuits corresponding to a certain engine operating condition and thereafter identify the elements of the carburetor circuit, and label these components using other pieces bearing indicia naming them. The simulator activity thus allows the student to use his hands as a learning tool, as well as his eyes and ears. By performing an activity using the simulator board and its accessories, the learning process is reinforced and the student takes an active part in learning and achieves understanding more quickly.

The simulator board and the accessories are best described with reference to the attached drawings.

DETAILED DESCRIPTION OF THE DRAWINGS

Figure 1:
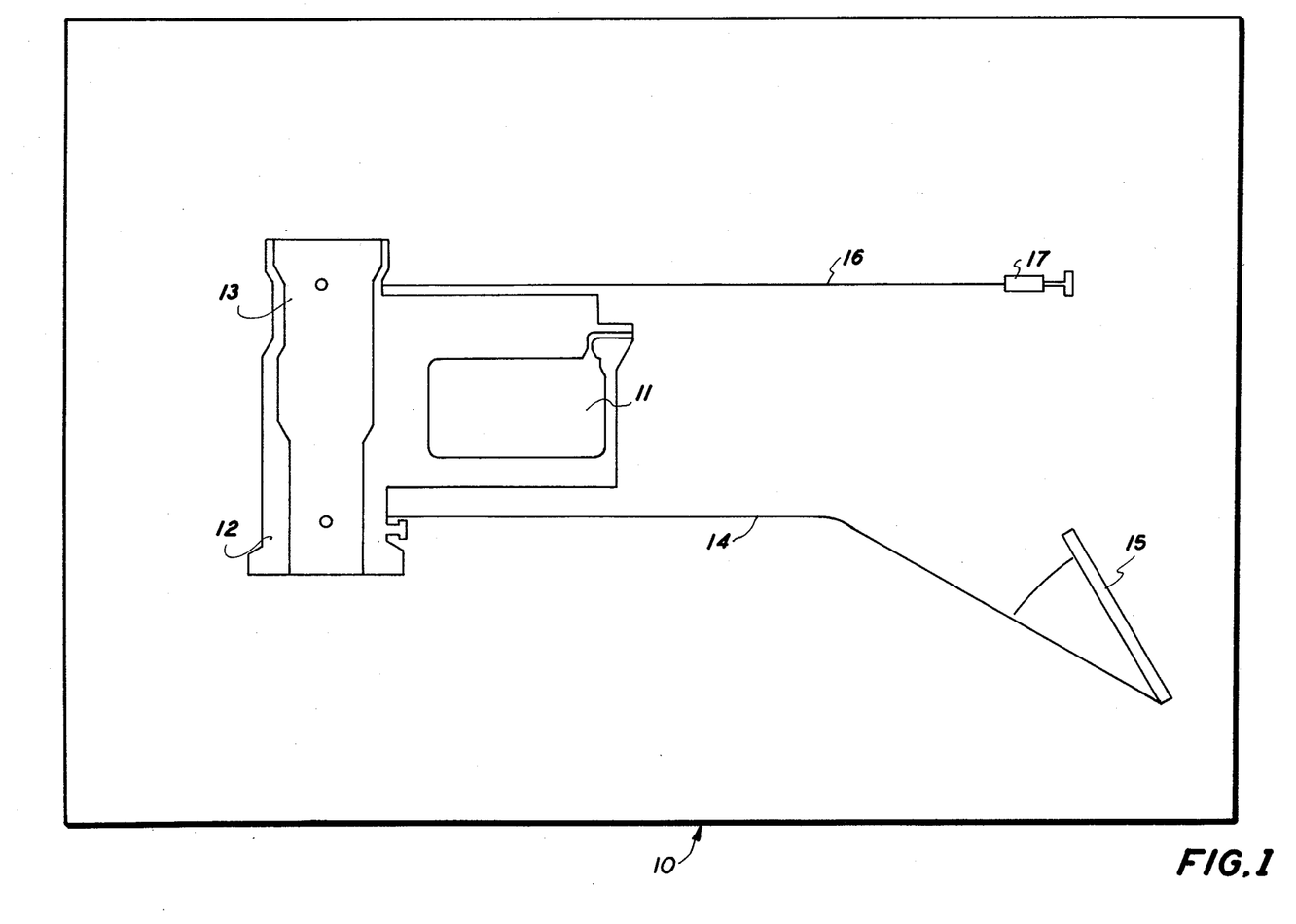
FIG. 1 is a plan view of the simulator board with graphic indicia thereon.

In FIG. 1 the simulator board 10 is shown having printed thereon graphic indicia depicting a schematic view of a total automotive carburetor system including a float bowl 11, a carburetor body 12, an air horn 13, a throttle linkage 14, an accelerator pedal 15, a fuel line 16, and a fuel pump 17. These diagrams serve as locations for positioning the manipulative pieces in order to simulate the assembly and operation of an automotive carburetor system which will be hereinafter described.

The simulator board may be constructed of a magnetically attractive sheet of rigid material such as ferrous metal or a magnetic ferrite plastic, or a thin sheet of ferrous metal coated with a thin layer of plastic material. The surface of the board is painted with a neutral background color such as a white or yellow enamel. The graphic indicia present on the board may be printed over the enamel in a suitably contrasting color such as black. Printing may be accomplished by any suitable means such as, for example, a silk screening process. Alternatively, the indicia may be printed on a sheet of clear plastic adapted to be superimposed over a blank board. Although the simulator board may consist solely of a thin sheet of metal with suitably smooth edges, the metallic sheet may also be laminated to a suitable backing member which imparts suitable rigidity thereto. Thus, the simulator board may comprise a thin sheet comprising ferrous metal having a thickness of about 1/32 inch laminated to a backing member made from a rigid material such as Masonite, fiberboard, or a resinous material, said backing material having a preferred thickness of about ¼ inch. The dimensions of the simulator board should be such that the board can be conveniently used by the student at a given work place. Boards having dimensions of about 15 × 20 inches, or approximately 300 square inches, are particularly suitable.

Figure 2A:
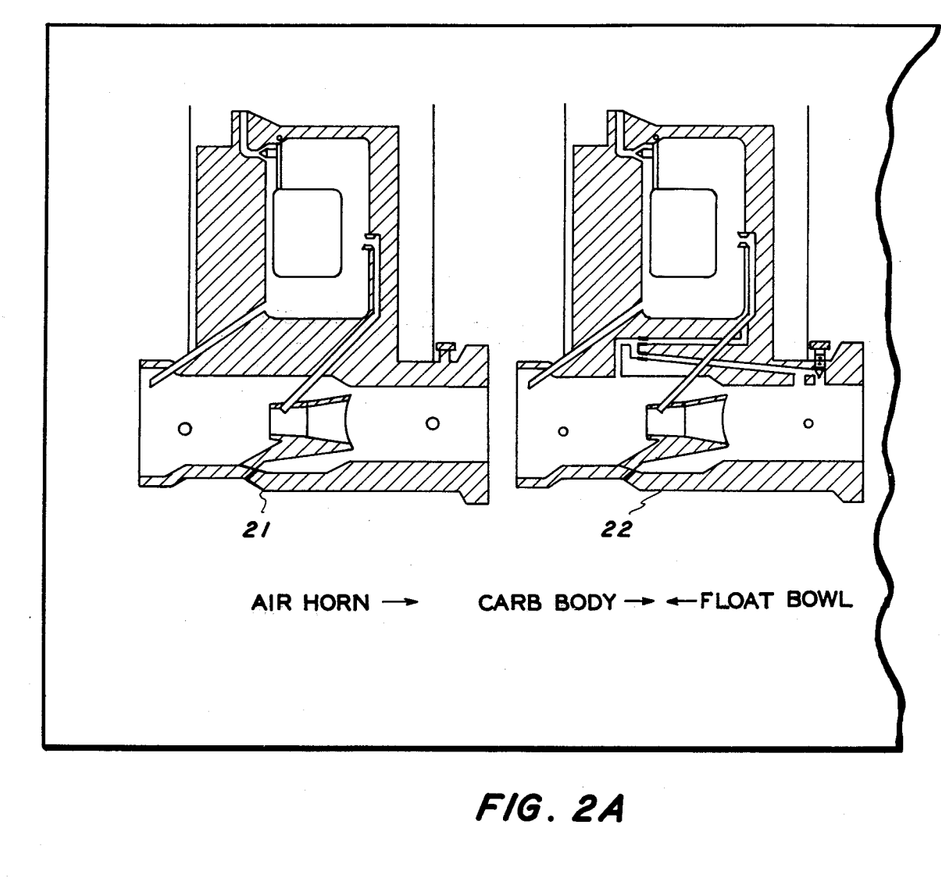
FIGS. 2A and 2B represent plan views of the left and right sides of the display board.
Figure 2B:
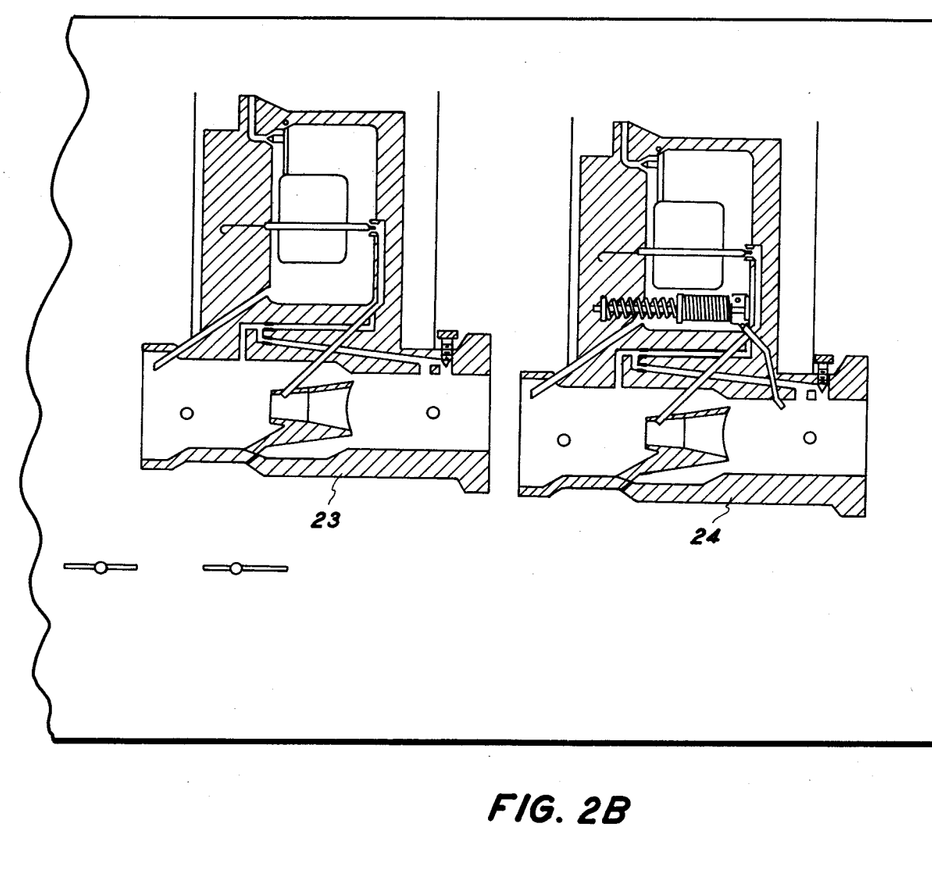

In FIGS. 2A and 2B the left and right sides of the display board are shown having printed thereon graphic indicia depicting four different air fuel carburetor circuits appropriate to various engine operating conditions, a throttle and choke plate, and word indicia. The four basic air/fuel circuits in FIGS. 2A and 2B are a float and medium speed cruising circuit 11, an idle and slow speed circuit 12, a high speed, power circuit 13, and an accelerator pump circuit 14. The display board is also constructed on a magnetically attractive material similar to the simulator board and the background indicia may be printed thereon in the same way. The purpose of the display board is to serve as a display and storage area for the magnetically attractive pieces which are used in conjunction with the simulator board. Each of the graphic indicia printed on the display board corresponds to the indicia printed on one of the pieces, thereby facilitating systematic storage and display of the pieces and allowing for quick inspection to determine that all of the pieces are accounted for. The edges of the board should be either smooth or rolled over to prevent injury from sharp edges.

Figure 3:
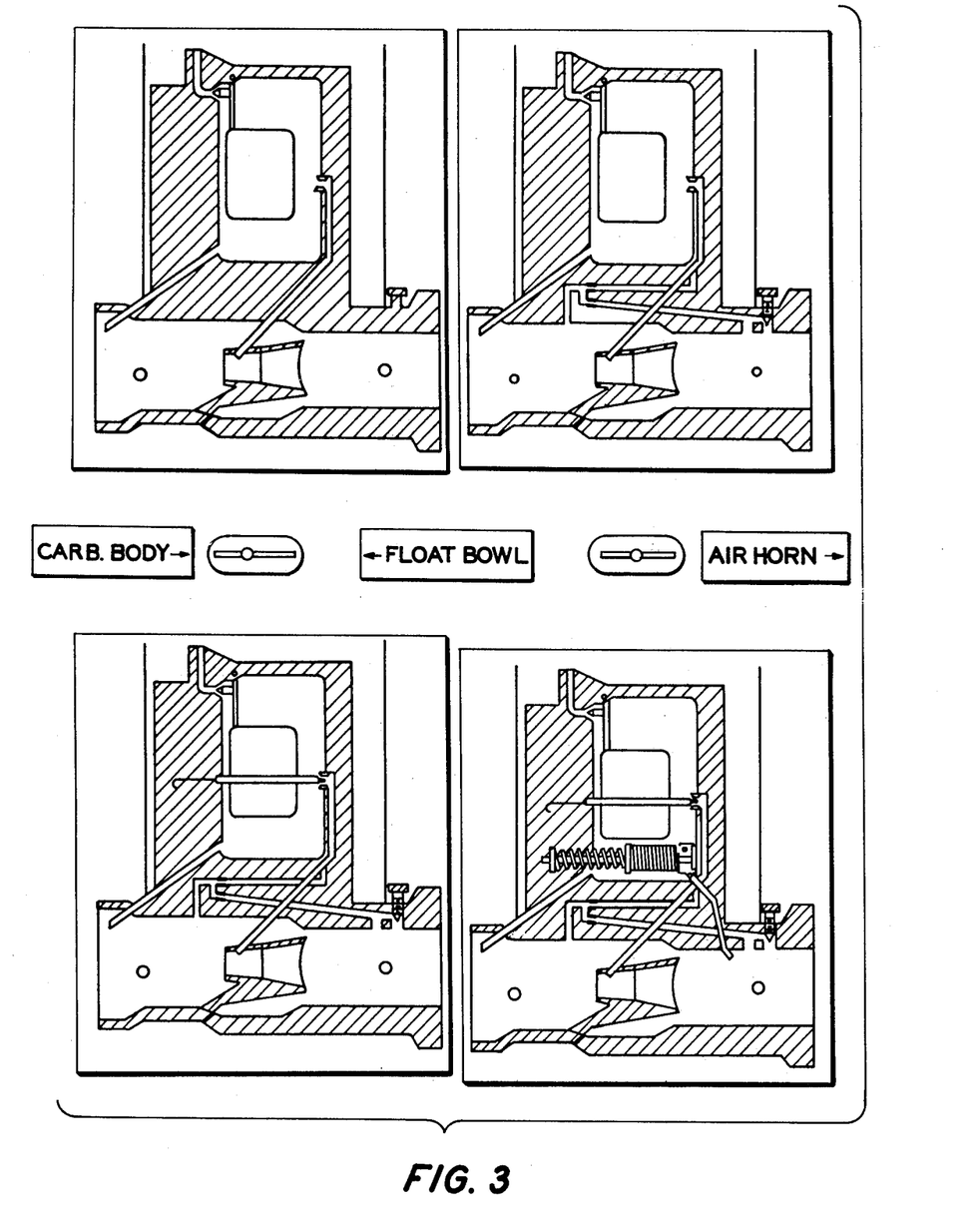
FIG. 3 is a plan view of some of the manipulative pieces having graphic indicia thereon.

The manipulative pieces used in the educational kit of this invention are shown in FIG. 3. Each of these pieces is made of a flat sheet of a rigid material such as metal or plastic and has laminated to the underside thereof smaller pieces of a magnetically attractive material such as metal or ferrite plastic. The preferred thickness of the pieces is approximately 1/16 of an inch and the thickness of a smaller section laminated to the underside of the pieces is about 3/32 of an inch.

As shown in FIG. 3, some of the pieces bear indicia depicting schematic side view diagrams of various air/fuel circuits for an automotive carburetor system and others of the pieces bear word indicia. Pieces 31 through 34 depict the four air/fuel circuits of an automotive carburetor set forth above for FIG. 2. Piece 35 depicts a throttle plate and piece 36 a choke plate.

In FIG. 3 there is shown pieces bearing word indicia such as "AIR HORN" and "FLOAT BOWL" and each having an arrow to facilitate designation of the particular part when used in conjunction with the schematic of FIG. 1. Specifically, a piece designating an element of one of the subsystems of FIG. 1 may be placed outside of the system with the arrow appropriately pointing out said element.

All of the depicted pieces in FIG. 3 are adapted for use in conjunction with the automotive carburetor schematic of the simulator board such that the student may simulate the construction and operation of an automotive carburetor system. For example, by properly superimposing the accelerator pump circuit piece 34 onto the carburetor schematic of FIG. 1, the student can visualize and understand the function of this particular circuit in an automotive carburetor system. A still broader understanding of the automotive carburetor system construction and mechanism is afforded the student by proper placement and manipulation of the remaining pieces into the remaining portions of the schematic of FIG. 1.

Figure 4:
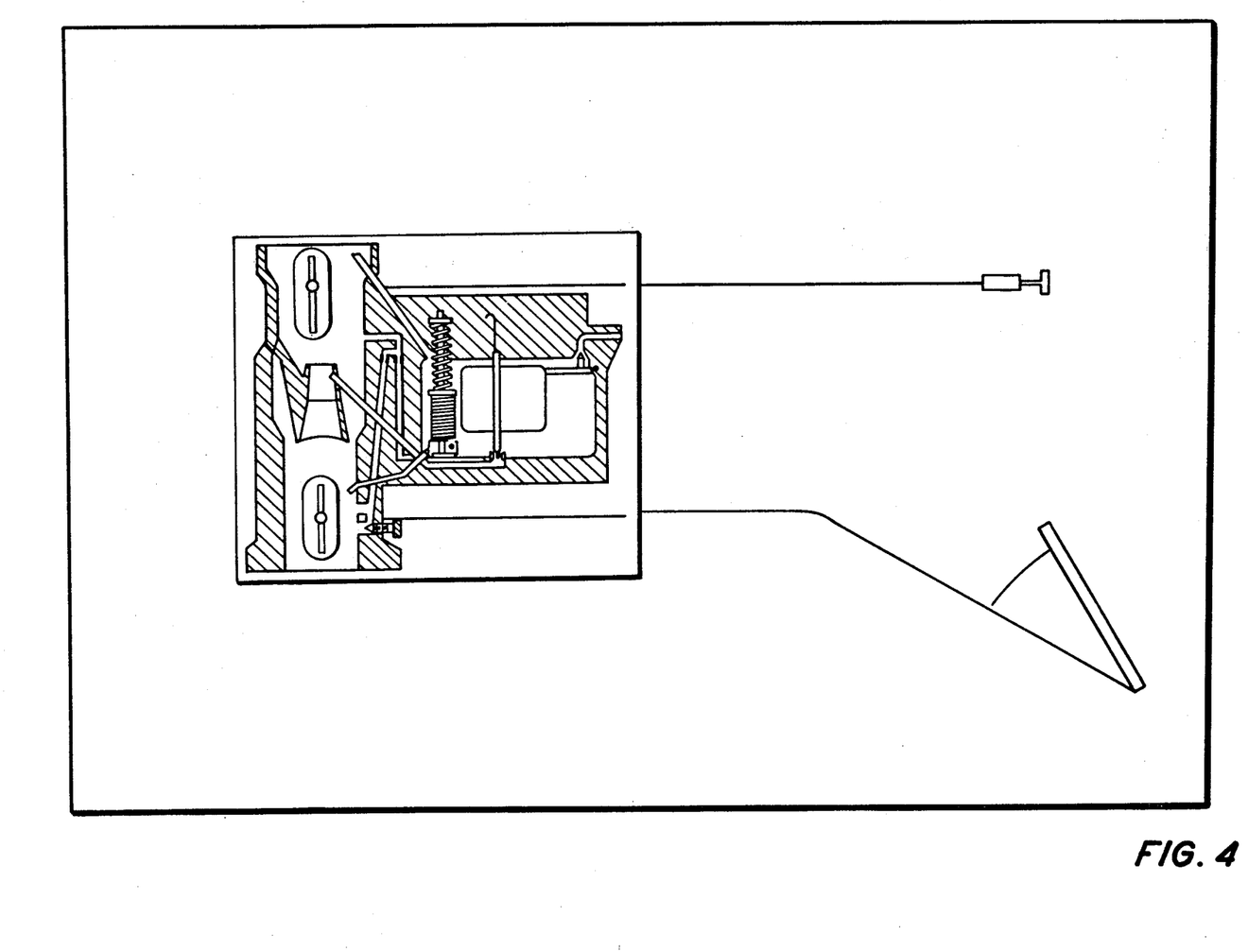
FIG. 4 is a plan view of the simulator board with certain of the manipulative pieces in place.
Figure 5:
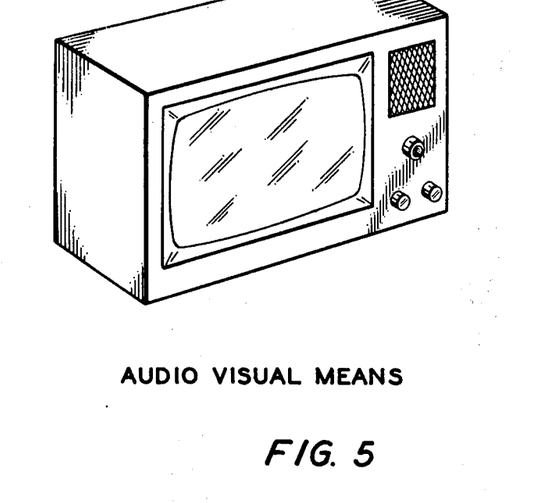
FIG. 5 illustrates generally an audiovisual device suitable for use in the present invention.
Figure 6:
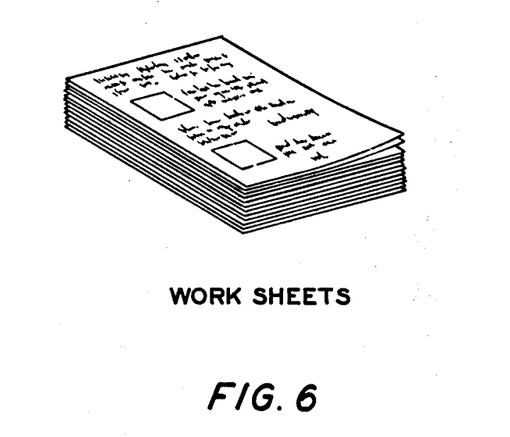
FIG. 6 illustrates generally worksheets in accordance with the present invention.
Figure 7:
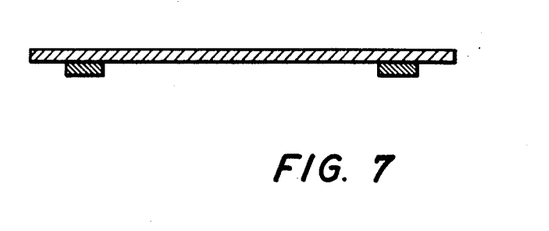
FIG. 7 is a side sectional view of a typical manipulative piece in accordance with the invention showing smaller magnetic sections laminated to the underside of the piece.

In FIG. 4 the simulator board is shown with certain of the manipulative pieces in place. On the schematic of the fuel system of FIG. 1, the general assembly of an automotive carburetor with an accelerator pump air/fuel circuit has been constructed by superimposing within the general schematic the appropriate pieces in the carburetor outline of FIG. 1. As can be seen this truly enables a student to appreciate the construction of a carburetor system.

As indicated above, the surfaces of the simulator board, the display board and at least the bases of the manipulative pieces are made from or contain a magnetically attractive material. The term magnetically attractive material is intended to encompass a material that is either itself magnetic or a material that is attracted to a magnet. Thus, where the surface of the boards is magnetic, the bases of the pieces have laminated thereto a section of a magnetic material such as magnetic plastic or metal, and the boards are made of a material that is attractive to a magnet such as galvanized steel.

All of the above materials are most conveniently supplied housed in a compartmentalized case for easy use and storage. Thus, the educational kit includes the simulator board, the display board, the manipulative pieces, the visual slides or tapes and the audio cassette. The kit may also include student work sheets, sample tests or quizzes to be given by the instructor before and after use of the unit, and an instructor's manual.

To illustrate how the educational kit of the present invention is used, the audiovisual presentation begins with a brief discussion of the general principles of an automotive carburetor system including a description of where the carburetor is located in an automotive system, its function, description of the paths that air and fuel must take to the carburetor, a description of an intake manifold and a fuel pump. The student's attention is then directed to FIG. 1 which represents a schematic of a basic automotive carburetor system. It is then explained that the basic carburetor has three sections: the float bowl or chamber 11, the air horn 13, and the carburetor body 12. Each of the major component parts of the automotive carburetor system represented in FIG. 1 are then in turn discussed and the student is shown what these parts look like by means of the visual diagrams in the accompanying audio presentation.

At various points throughout the audiovisual presentation the student is requested to turn to the simulator board of FIG. 1 and the accessory pieces associated therewith in order to physically simulate or describe the various component parts of an automotive carburetor assembly. For example, the various components of the carburetor can be depicted by positioning the descriptive manipulative pieces, i.e., the AIR HORN, the CAR BODY, and FLOAT BOWL pieces are positioned appropriately about the carburetor outline of FIG. 1 with the respective arrows pointing to the appropriate elements of the basic carburetor system. From this exercise the student can appreciate the identity of the various components of an automotive carburetor. Along with this exercise the student is shown pictures of actual carburetors and the corresponding elements described in same.

The instructional means subsequently turns to a detailed discussion as to appropriate combustable mixtures of gasoline and air. Therefore it is explained that a carburetor delivers a 15 to 1 mixture to an engine when cruising at a constant speed on a level road. Also in most carburetors a 15 to 1 mixture is sufficient for any constant speed between 25 and 75 miles an hour. It is further explained that a richer mixture, between 13 to 1 and 11 to 1, means that if air flow into the carburetor is constant, more gasoline is in the mixture delivered to the engine. It is noted that a richer mixture gives more power but consumes almost 15 percent more gasoline than the ideal mixture. From this discussion the student gains an understanding of the function of a carburetor and regulating the mixture of gasoline and air at different speeds.

The instructional means then directs the student's attention to other circuits in a carburetor and under what conditions they are used to provide an air/fuel mixture to the engine. In this particular section of the instructional means the student is directed to the manipulative pieces 31 through 34 of FIG. 3 and further directed place them in the carburetor outline of FIG. 1. The placing of each of these pieces corresponds to a discussion of the respective carburetor circuits. Therefore, before a discussion an analysis of the float and medium speed cruising circuit, the student is instructed to place piece 31 of FIG. 3 onto the carburetor schematic of FIG. 1. Therefore, the student is able to understand the components of an automotive carburetor as well as the principles upon which it functions. For example, the student comes to appreciate why more fuel is consumed at certain speeds than in others. FIG. 4 demonstrates the construction of an accelerator pump circuit.

Throughout the audiovisual presentation each of the principles surrounding the subsystems set forth in the schematic diagram of FIG. 1 are explained. Therefore, by reference to physical principles to which the student is well aware, he is able to get a more complete understanding as to the functional parts of an automotive carburetor.

The above described educational kit thus provides the student with an opportunity of exploring concepts involved in the operation of an automotive carburetor assembly by simulating the construction and arrangement of parts involved in such a system. The educational kit is programmed such that the student will encounter a minimum of frustration and a maximum learning efficiency during the use of the kit. Upon completion of the kit, the student should be able to explain the function of a carburetor; identify a carburetor body, a float bowl, an air horn, and throttle valve; select the appropriate air/fuel ratio from a list of three possible choices, given one of the operating conditions: cruising at a constant speed between 25 m.p.h. and 70 m.p.h.: idling, fast idle, or slow speed; constant speed about 70 m.p.h.; accelerating; and starting; given a drawing of a float and medium cruising circuit, identify a float, needle valve, an air vent, a main discharge tube, a venturi, and an air bleed; given a drawing of an idle and slow speed circuit, identify an air bleed, a bypass tube, an idle port, an off idle port, and an idle adjustment screw; given a drawing of a high speed power circuit, identify a main discharge jet and a metering rod; given a drawing of an accelerator pump circuit, identify an inlet valve, a pump diaphragm, a pump chamber, a discharge tube and a pump rod and springs; given an internal schematic drawing of a carburetor, list four circuits in a carburetor; and given a specific carburetor circuit, trace the path air and fuel will take to the carburetor to the intake manifold.

A complete description of the educational kit encompassed by the present invention may be found in the booklet entitled "Automotive Technology - Principles of Carburetion Fuel System Fundamentals" (unit 10269-80), published as part of the Occupational Technology Series by the Xerox Corporation.

What is claimed is:

1. An educational kit programmed for teaching the assembly, relationship of parts, and operation of an automotive carburetor system comprising:
   a. a simulator board having a surface of magnetically attractive material and including graphic indicia on the surface thereof defining a schematic diagram of an automotive carburetor system including a float bowl, a carburetor body, an air horn, a throttle linkage, an accelerator pedal, a fuel line and a fuel pump, the indicia on said simulator board being as shown by the non-numerical indicia of FIG. 1;
   b. a plurality of magnetically attractive manipulative pieces each bearing individually on their surfaces graphic indicia defining items found within an automotive carburetor system, said pieces comprising (i) a plurality of pieces each containing indicia defining elements found within an automotive carburetor assembly; and (ii) a plurality of pieces each containing word indicia defining various segments of an automotive carburetor system, the pieces being adapted for manipulation within the confines of the elements of the automotive carburetor system of the simulator board, the indicia on said manipulative pieces being as shown by the non-numerical indicia of FIG. 3;
   c. a display board for said manipulative pieces including a sheet of magnetically attractive material, said display board having graphic indicia on a surface thereof in spaced relationship, said graphic indicia corresponding to the indicia present on each of said manipulative pieces, said manipulative pieces adapted for storage on and removal from said display board; and
   d. audiovisual instructional means for presenting information relevant to the basic principles about automotive carburetor systems including information defining (i) the elements of the automotive carburetor system on the simulator board, (ii) the indicia on the manipulative pieces, (iii) the indicia on said board, (iv) the relationship of the indicia on the simulator board to the indicia on said pieces and use of same on said board whereby the assembly, relationship of parts, and operation of an automotive carburetor system can be learned by the user by using said board in response to said instructional means.

2. An educational kit according to claim 1 wherein said manipulative pieces are magnetic.

3. An educational kit according to claim 1 wherein said manipulative pieces comprise a flat sheet of rigid material having smaller sections of a magnetic material laminated thereto.

4. An educational kit according to claim 1 wherein the indicia depicted on said manipulative pieces comprises subsystem components of an automotive carburetor system, including four different air/fuel carburetor circuits, a throttle plate and a choke plate.

5. An educational kit according to claim 1 wherein said audio instruction means includes tape recordings which are synchronized with said visual instruction means which includes slides or filmstrips.

6. An educational kit according to claim 1 wherein said instruction means includes a plurality of student work sheets, said work sheets being adapted for use by the student to record information and test the student in response to said audiovisual instruction means.

7. An educational kit according to claim 1 wherein said simulator board, said manipulative pieces, and said display board are constructed of a substantially rigid material.

8. An educational kit according to claim 1 further comprising a compartmentalized case, said case being adapted for storage of said kit.

* * * * *